United States Patent
Wood

(10) Patent No.: US 9,519,776 B2
(45) Date of Patent: Dec. 13, 2016

(54) COMPUTER SECURITY SYSTEM AND METHOD

(71) Applicant: Charles Wood, Pittsburgh, PA (US)

(72) Inventor: Charles Wood, Pittsburgh, PA (US)

(73) Assignee: Duquesne University of the Holy Spirit, Pittsburgh, PA (US)

( * ) Notice: Subject to any disclaimer, the term of this patent is extended or adjusted under 35 U.S.C. 154(b) by 91 days.

(21) Appl. No.: 14/267,545

(22) Filed: May 1, 2014

(65) Prior Publication Data

US 2015/0047037 A1   Feb. 12, 2015

Related U.S. Application Data

(60) Provisional application No. 61/862,600, filed on Aug. 6, 2013.

(51) Int. Cl.
*G06F 11/00* (2006.01)
*G06F 21/55* (2013.01)
*H04N 1/32* (2006.01)

(52) U.S. Cl.
CPC .......... *G06F 21/55* (2013.01); *H04N 1/32352* (2013.01); *G06F 2221/2107* (2013.01)

(58) Field of Classification Search
CPC ... G06F 21/55; G06F 21/2107; H04N 1/32144
See application file for complete search history.

(56) References Cited

U.S. PATENT DOCUMENTS

| 7,249,257 | B2 * | 7/2007 | Brundage | G06F 21/6209 380/258 |
| 8,321,936 | B1 * | 11/2012 | Green | H04L 63/1416 718/1 |
| 8,607,354 | B2 * | 12/2013 | Levy | G06F 21/10 713/180 |
| 8,984,644 | B2 * | 3/2015 | Oliphant | G06F 21/554 726/22 |
| 2002/0025036 | A1 * | 2/2002 | Sato | H04L 41/28 380/42 |
| 2005/0097179 | A1 * | 5/2005 | Orme | H04L 12/585 709/207 |
| 2010/0250497 | A1 * | 9/2010 | Redlich | F41H 13/00 707/661 |
| 2013/0104231 | A1 * | 4/2013 | Niner | H04L 63/1466 726/23 |

OTHER PUBLICATIONS

Johnson, Neil F. and Jajodia, Sushil, "Steganalysis of Images Created Using Current Steganography Software," <http://www.cs.arizona.edu/~collberg/Teaching/620/1999/Handouts/ashwin2.pdf>.
Johnson, Neil F. and Jajodia, Sushil, "Steganalysis of Images Created Using Current Steganography Software," <http://m.tech.uh.edu/faculty/conklin/IS7033Web/7033/Week7/steganalysis.pdf>, Lecture Notes in Computer Science vol. 1525, 1998, pp. 273-289.
Ker, Andrew D. et al., "Moving Steganography and Steganalysis from the Laboratory into the Real World," <http:// www.ws.binghamtomedu/fridrich/research/ih067-ker.pdf>, Ih&MMSec'13, Jun. 17-19, 2013, Montpellier, France.

* cited by examiner

*Primary Examiner* — Mohammad W Reza
*Assistant Examiner* — Khoi Le
(74) *Attorney, Agent, or Firm* — Barbara E. Johnson, Esq.

(57) ABSTRACT

The present invention is a computer security system and method in which the various algorithms not only do not search for or detect the presence of a steganographic or other hidden image in a data file or across data files, but also includes at least one or more combined approaches for altering and neutralizing any hidden messages without significantly detracting from the underlying integrity of the data file or files thus treated.

6 Claims, No Drawings

COMPUTER SECURITY SYSTEM AND METHOD

CROSS-REFERENCE TO RELATED APPLICATION

This patent application claims priority to, and incorporates herein by reference in its entirety, U.S. Provisional Patent Application No. 61/862,600 filed 6 Aug. 2013.

BACKGROUND OF THE INVENTION

Field of the Invention

The invention relates to a wide reaching computer security system and method designed to remove virtually any if not all steganographic alterations in any data file or files or across data files.

Description of Related Art

Current wisdom in the field of computer science embraces a) acknowledgement of the threat of steganography in data files and b) the importance of detecting the presence of steganographic alteration when and where it appears, prior to c) removing or neutralizing such alterations as desired once they are detected.

It is already well known, in the computer security art, that steganography involves the placing of messages within images or other data files, in ways that the embedded messages cannot be detected by visual inspection and often times not even by other inspection/detection means. If a "bad actor" (criminals, etc.) can encrypt a message into an image or other data file, the message can include matters of personal identity theft, child pornography, national security and etc., and can pass messages undetected from computer to computer unless there is a tool to catch and remove (or neutralize) the hidden message. Damage can occur ranging from financial losses—possibly in the extreme—to and including matters of ultimate life-and-death war, loss and horrific tragedy outcomes. The war time "For the Want of a Nail" poster applies one-hundred-or-more fold to the need to stop transmission of steganographic messages in data files, to prevent widespread disasters. At this writing, tools which detect steganographic payloads prior to decoding or neutralizing them are enormously cumbersome and inefficient for the preponderance of computer security applications for which stego-image neutralization is needed. This was pointed out in a June 2013 presentation in Montpellier France, by some of the internationally-recognized experts in steganalysis, who admit that current steganalytic solutions, including by some the presenters, only apply in laboratory conditions and some are heavily hedged by assumptions and caveats; significant challenges remain unsolved in order to implement good steganography and steganalysis in practice. See Ker, Andrew D., Patrick Bas, Rainer Böhme, Rémi Cogranne, Scott Craver, Tomáš Filler, Jessica Fridrich, and Tomáš Pevný. "Moving Steganography and Steganalysis from the Laboratory into the Real World," in Proceedings of the First ACM Workshop on Information Hiding and Multimedia Security, pp. 45-58. ACM, 2013.)) Even the title of this paper, "Moving Steganography and Steganalysis from the Laboratory into the Real World," illustrates both the appreciated high hurdle of real-world steganography fighting and the presumed axiomatic nature of steganography and steganalysis as inseparable. Most notably, however, the Ker et al. article identifies, in easy-to-read section headings, twenty-three enumerated "open problems" in addressing steganography, even though as the article itself sets forth at the outset, "steganography is now a fairly standard concept in computer science." If a standard concept has, as of June 2013, twenty-three "open problems," there can be no question that meaningful and broad-basis solutions for steganography have not heretofore been recognized to date.

There remains a need in computer science, therefore, for broadly applicable and effective, simple and inexpensive means for dealing with—and eradicating—steganography in digital media.

SUMMARY OF THE INVENTION

In order to meet this need, the present invention is a computer scrubbing tool that accomplishes removal of a hidden message in a data file such as an image file, or across data files, by conducting one or more of the following described steps using a computer. In addition and importantly, the present invention does not deploy any algorithm or routine to detect any steganographic or other payload message as a first (or as any) step, and instead disables or scrubs any steganographic payload which is present without even looking to see if there is one! Prior art methods of dealing with steganography ubiquitously asked whether a steganographic payload was present, whereas the present invention saves time, computing power, bandwidth, file size, complexity and concomitant unreliability by eliminating the traditional detection step altogether AND by performing one or more steganographic scrubbing methods which are effective against most or all payloads without degrading the underlying data file. The remaining one or more steps of the computer security system and method (beyond the affirmative step of NOT attempting to detect a payload) are selected from the group consisting of: a) changing some or all of the one or more least significant bit or bits in bytes that are used to represent image colors or grey scale, audio sounds, animation, spacing, font characteristics, page layout characteristics, metadata structures, packet headers, and/or video within multimedia data files, in a way that cannot be reversed once the change is deployed, by i) changing all the least significant bits to 1; or ii) changing all the least significant bits to 0; iii) randomly changing some of the one or more least significant bits, prior to any reception or transmission of the data file; b) re-applying non-no-loss compression to a compressed file (e.g., LOSSY compression to a JPEG file or any other data file susceptible of LOSSY compression including but not limited to au, mpeg, and mp3 files) as a step which not only provides compression but also eradication of any steganographically hidden message therein; c) converting a data file not susceptible of compression to a file susceptible of compression, applying non-no-loss compression, and returning the converted file thus compressed to its original data file format; d) applying to executable data files, prior to reception or transmission of such files, a known "optimizing compiler" software or routine to remove hidden messages, such optimizing compiler software routines' including but not being limited to optimizing compilers that remove unreachable code within executable files that is branched around or placed at the end of the executable file or which remove "NOP" or no operation codes from executable files; and e) removing from data files, including but not limited to multimedia files, PDF/Adobe Acrobat files, or Microsoft Office or OpenOffice type files, all mega-metadata such as comments, data included in data areas such as after the "end of file" marker, and any other known metadata, for the purpose of obliterating any hidden message conveyed via metadata while at the same time scrubbing metadata for other purposes. When the present computer security system and method is used to scrub one or more data files, or across data files, any steganographic or other hidden payload is neutralized without first investigating whether any payload is present. Note for the purposes of the above-described manipulation of the least significant bit or bits that the least significant bit itself is always addressed, as described above, and optionally the second least significant bit and the third least significant bit of the byte may also be altered (by changing all 1s to 0s, by changing all 0s to 1s or by randomly changing some) without departing from the intention of the invention. Generally steganography does not encode into the fourth least significant bit or higher because such payloads can be so easily detected, even by visual inspection. Having said that, however, if and when desired the present scrubbing step may be applied to fourth least significant bits or higher, with the understanding that the preferred embodiment of the invention involves addressing the first least significant bit, and optionally the second least significant and third least significant bits, as the likely locus of payload in any event.

DETAILED DESCRIPTION OF THE INVENTION

Unlike the computer science world at this writing—which is currently focused on detecting steganographic messages—the present invention is a SCRUB tool, which can and should be used on virtually all transmitted data files including image files, to remove any steganographic or other embedded message whether or not any such message exists. The present invention is a scrubbing tool to obliterate any hidden message in an image or data file, without even investigating first to see whether there is such a message. According to current wisdom prior to the present invention, any steganographic images or other data file alterations are neutralized or rendered benign only after the steganographic data file alteration has first been identified. In other words, "steganalysis" is at this writing understood to include the sequential steps of discovering (first) and either prohibiting the transmission of or rendering useless (second, and if desired) steganographically inserted messages in data files, with the believed-to-be key initial step of discovery or detection of the presence of the steganographically generated message. The present invention breaks completely with current computer science thinking, in that current typical approaches investigate whether a steganographic or other hidden message is present in a data file, whereas the present invention is a tool that can be used to neutralize any hidden message in any transmitted data file or across data files, whether a hidden message is present or not.

As described in the previous section, the invention is a computer scrubbing tool that accomplishes removal of a hidden message in a data file such as an image file, or across data files, by conducting one or more of the following described steps using a computer. In addition and importantly, the present invention does not deploy any algorithm or routine to detect any steganographic or other payload message as a first (or as any) step, and instead disables or scrubs any steganographic payload which is present without determining whether there is one. Prior art methods of dealing with steganography ubiquitously asked whether a steganographic payload was present, whereas the present invention saves time, computing power, bandwidth, file size, complexity and concomitant unreliability by eliminating the traditional detection step altogether AND by performing one or more steganographic scrubbing methods which are effective against most or all payloads without degrading the underlying data file. The remaining one or more steps of the computer security system and method (beyond the affirmative step of NOT attempting to detect a payload) are selected from the group consisting of: a) changing some or all of the one or more least significant bit or bits in bytes that are used to represent image colors or grey scale, audio sounds, animation, spacing, font characteristics, page layout characteristics, metadata structures, packet headers, and/or video within multimedia data files, in a way that cannot be reversed once the change is deployed, by i) changing all the least significant bits to 1; or ii) changing all the least significant bits to 0; iii) randomly changing some of the one or more least significant bits, prior to any reception or transmission of the data file; b) re-applying non-no-loss compression to a compressed file (e.g., LOSSY compression to a JPEG file or any other data file susceptible of LOSSY compression including but not limited to au, mpeg, and mp3 files) as a step which not only provides compression but also eradication of any steganographically hidden message therein; c) converting a data file not susceptible of compression to a file susceptible of compression, applying non-no-loss compression, and returning the converted file thus compressed to its original data file format; d) applying to executable data files, prior to reception or transmission of such files, a known "optimizing compiler" software or routine to remove hidden messages, such optimizing compiler software routines' including but not being limited to optimizing compilers that remove unreachable code within executable files that is branched around or placed at the end of the executable file or which remove "NOP" or no operation codes from executable files; and e) removing from data files, including but not limited to multimedia files or Microsoft Office or OpenOffice type files, all mega-metadata such as comments, data included in data areas such as after the "end of file" marker, and any other known metadata, for the purpose of obliterating any hidden message conveyed via metadata while at the same time scrubbing metadata for other purposes. When the present computer security system and method is used to scrub one or more data files, or across data files, any steganographic or other hidden payload is neutralized without first investigating whether any payload is present. Note for the purposes of the above-described manipulation of the least significant bit or bits that the least significant bit itself is always addressed, as described above, and optionally the second least significant bit and the third least significant bit of the byte may also be altered (by changing all 1s to 0s, by changing all 0s to 1s or by randomly changing some) without departing from the intention of the invention. Generally steganography does not encode into the fourth least significant bit or higher because such payloads can be so easily detected, even by visual inspection. Having said that, however, if and when desired the present scrubbing step may be applied to fourth least significant bits or higher, with the understanding that the preferred embodiment of the invention involves addressing the first least significant bit, and optionally the second least significant and third least significant bits, as the likely locus of payload in any event. The invention removes both essential and decoy hidden messages, such as can be generated by OpenPuff.

The following file types may be scrubbed by the present invention if two of the software features include a), the alteration of the least significant bit: Image support type files (including but not limited to BMP, JPG, PCX, PNG, TGA, GIF); Audio support file types (including but not limited to AIFF, MP3, NEXT/SUN, WAV, AU); video support file types (including but not limited to 3GP, MP4, MPG, VOB); and Flash-Adobe type file support (including but not limited to FLV, SWF, PDF). For the Flash-Adobe type support, flash is a video format, and PDF is a document format that relies on images and thus can be used in a least significant bit embedding in addition to allowing material in the metadata. The present computer security system and method can remove hidden payloads and decoys from all of these files using the alteration of the least significant bit approach. Metadata document support (including but not limited to Images, PDF, Word, Excel, PowerPoint, Visio, WordPerfect, Access) is also possible using the present invention as described above.

Many file formats, such as Microsoft's ".docx," use a compressed file format (.zip) file to store their document, and rename the extension from .zip to .docx. Using such file formats, it is easy to place another file in these formats. For instance, Microsoft Word .docx files are, in actuality, compressed .zip files that contain three folders (called "_rels", "docProps", and "word"). It is straightforward to add another folder that Microsoft Word (for example) will just ignore that contains secret documents. These additional folders conceptually fall outside the typical definitions of metadata, and therefore the present invention embraces removing extraneous folders and files from compressed files and compression-based data files, including but not limited to Microsoft Word and Apple Pages.

One can use the least significant bit scrubbing paradigm on all images and multimedia files including adobe pdf, and executables, and even on Word or Excel or similar files that have more than merely numeric content. For example, steganography has been known to be included within Word file line spacing, line height, or character height (spacing and layout characteristics)—and the bytes for these parameters may be scrubbed as to their least significant bits the way any other byte can be scrubbed. There are a relatively few file types that cannot be scrubbed using the least significant bit scrubbing technique disclosed herein, however: plain ASCII text files; Excel or similar spreadsheet files containing predominantly only numeric data, or encrypted files such as Zip files. However, ASCII texts and spreadsheets containing predominantly only numeric data do not provide useful fodder to steganographers anyway, precisely because there is so little peripheral material in them to provide cover to the hidden message.

An important feature of the "least significant bit" scrubbing approaches described above is that they are minimally deleterious to the underlying data file. The present scrubbing technique of changing the least significant bit of various bytes, or even the first least significant, second least significant, and third least significant bits, can be run innumerable times—even a million times—without sequential degradation of the underlying data file. The same cannot be said of other payload eradication approaches known in the art.

All of the elements of the present computer security system and method are within the skill of the art. "Non-noloss" compression, such as LOSSY compression, is a well known approach in the computer science arts. Software designers can implement into a software tool the necessary algorithms to support changing some or all of the one or more least significant bit or bits in bytes that are used to represent image colors or grey scale, audio sounds, animation, spacing, font characteristics, page layout characteristics, metadata structures, packet headers and/or video within multimedia data files, in a way that cannot be reversed once the change is deployed, by i) changing all the least significant bits to 1; or ii) changing all the least significant bits to 0; or iii) randomly changing some of the one or more least significant bits, prior to any reception or transmission of the data file. Likewise, the current skill in the art enables one of ordinary skill to apply or re-apply LOSSY compression or to implement any other of the listed possible elements of the present software tool. The invention inheres in the use of one or more of the listed software elements in an overall system and method in which any sort of investigation of the presence or absence of a steganographic image does not take place as a first step of the method, or as any step of the method. The result is a robust tool with wide-ranging application, that neutralizes any hidden messages in data files or across data files without having to determine whether there is any hidden message present.

Although the invention has been described with particularity above, with specific reference to individual elements and applications, the invention is only to be limited insofar as is set forth in the accompanying claims.

I claim:

1. A computer security method consisting essentially of selecting a computer;
   selecting a program embodied in said computer configured to execute steps;
   said program being free from any code or algorithm for identifying the presence of a steganographic payload in a computer file to be analyzed by said program; and
   said program containing algorithms to remove one or more hidden messages in a data file or across data files by selecting at least one data file containing a hidden message and selected from the group consisting of an image file, an audio file, a video file, a Flash-Adobe type file and a Metadata document support type file, and
   changing in said at least one data file some or all of the one or more least significant bit or bits in bytes that are used to represent image colors or grey scale, audio sounds, animation, spacing, font characteristics, page layout characteristics, metadata structures, packet headers and/or video within multimedia data files, in a way that cannot be reversed once the change is deployed, by i) changing all the least significant bits to 1; or ii) changing all the least significant bits to 0; or iii) randomly changing some of the one or more least significant bits; or iii) incrementing or decrementing the value of the least significant bit by some value; or iv) using some computer algorithm, program, or module that alters the least significant bits, prior to any reception or transmission of the data file, wherein when said program is deployed using a computer to process at least one data file, said hidden message in said data file is neutralized.

2. The computer security method according to claim 1, wherein said data file is treated by said computer security system and method prior to transferring said file from a secured computer network to another computer network.

3. The computer security method according to claim 1 further including a scrambling method that adjusts the bits in said data file.

4. The computer security method according to claim 1 wherein said method includes conversion methods that convert each least significant bit in each byte in an image file to either all "0s" or all "1s".

5. The computer security method according to claim 1 wherein said method includes applying encryption methods that neutralize any steganographic embedding or tracking of any hidden message in said data file.

6. The computer security method according to claim 1 wherein said data file contains at least one hidden message and at least one decoy message.

\* \* \* \* \*